US011722525B2

(12) United States Patent
Lou et al.

(10) Patent No.: US 11,722,525 B2
(45) Date of Patent: Aug. 8, 2023

(54) IPSEC PROCESSING OF PACKETS IN SOCS

(71) Applicant: Cisco Technology, Inc., San Jose, CA (US)

(72) Inventors: Shuxian Lou, San Jose, CA (US); Jie Chu, Los Altos, CA (US); Jonathan Rosen, Cary, NC (US); Douglas Michael Toney, Raleigh, NC (US); Harikrishnan Pillai, San Jose, CA (US); Feng Cao, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 125 days.

(21) Appl. No.: 17/230,675

(22) Filed: Apr. 14, 2021

(65) Prior Publication Data

US 2022/0337627 A1  Oct. 20, 2022

(51) Int. Cl.
*H04L 29/06* (2006.01)
*H04L 9/40* (2022.01)
*G06F 16/2455* (2019.01)

(52) U.S. Cl.
CPC .......... *H04L 63/20* (2013.01); *G06F 16/2455* (2019.01)

(58) Field of Classification Search
CPC ....... H04L 63/20; H04L 63/16; H04L 63/145; H04L 63/205; H04L 63/06; H04L 63/061
USPC ............................................................ 726/1
See application file for complete search history.

(56) References Cited

U.S. PATENT DOCUMENTS

| 7,017,042 | B1 | 3/2006 | Ziai et al. |
| 7,246,245 | B2 * | 7/2007 | Twomey ............. H04L 63/0485 713/189 |
| 7,409,542 | B2 * | 8/2008 | Minnick ............. H04L 63/0485 713/153 |
| 7,434,045 | B1 | 10/2008 | Enderwick et al. |
| 2009/0178104 | A1 | 7/2009 | Shah et al. |
| 2009/0319775 | A1 | 12/2009 | Buer et al. |
| 2013/0013915 | A1 | 1/2013 | Overby, Jr. et al. |

FOREIGN PATENT DOCUMENTS

CN  1543131 A  * 11/2004

* cited by examiner

*Primary Examiner* — Longbit Chai
(74) *Attorney, Agent, or Firm* — Lee & Hayes, P.C.

(57) ABSTRACT

Techniques and mechanisms for IPsec processing of IPsec packets for routing platforms where IPsec is just one or more features in the middle of data path features on the packet processing path and hence, the typical, simple inline IPsec scheme does not work well for such platforms. The techniques include using a hardware look-up table for packet classification and inbound security association (SA) lookup in one pass with IP 5-tuple plus SPI as a lookup key at hardware table. The techniques provide an entry match action format and mechanism for deriving inbound SA dram addresses that may be used by a hardware (HW)/firmware (FW) crypto/IPsec engine to process inbound packet traffic. A software SA look-up table is also provided to overcome hardware look-up table resource limitations and support more IPsec session scaling than the physical hardware look-up table can handle. Additional techniques are described.

20 Claims, 5 Drawing Sheets

IPSEC PROCESSING OF PACKETS IN SOCS

TECHNICAL FIELD

The present disclosure relates generally to inline cryptographic/IPsec packet processing, and more particularly to inline cryptographic/IPsec packet processing for packets where IPsec is just one feature in the IPsec packet's feature array and is in the middle of data path features on the packet processing path.

BACKGROUND

In computing, Internet Protocol (IP) Security (IPsec) is a secure network protocol suite that authenticates and encrypts packets of data to provide secure encrypted communication between two computers over an IP network. It is used in virtual private networks (VPNs). IPsec includes protocols for establishing mutual authentication between agents at the beginning of a session and negotiation of cryptographic keys to use during the session. IPsec can protect data flows between a pair of hosts (host-to-host), between a pair of security gateways (network-to-network), or between a security gateway and a host (network-to-host). IPsec uses cryptographic security services to protect communications over IP networks. IPsec supports network-level peer authentication, data-origin authentication, data integrity, data confidentiality (encryption), and replay protection. The initial IPv4 suite was developed with few security provisions. As a part of the IPv4 enhancement, IPsec is a layer 3 OSI model or internet layer end-to-end security scheme. In contrast, while some other Internet security systems in widespread use operate above layer 3, such as Transport Layer Security (TLS) that operates at the Transport Layer and Secure Shell (SSH) that operates at the Application layer, IPsec can automatically secure applications at the IP layer.

Thus, the concept of inline cryptographic (crypto)/IPsec in a system on a chip (SoC) is not new. Inline crypto/IPsec has been used by many hardware vendors in their hardware and such vendors have been working on their inline IPsec support in their hardware. Such inline IPsec support is generally simple and good for applications that just need IPsec, i.e., no other data path features are before IPsec for inbound (decryption direction) IPsec packets, as well as after IPsec for outbound (encryption direction) IPsec packets. However, on some routing platforms, IPsec is just one or more features in the middle of data path features on the packet processing path and hence, the simple inline IPsec scheme does not work well for such platforms.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques for IPsec processing of IPsec packets for routing platforms where IPsec is just one or more features in the middle of data path features on the packet processing path and hence, the typical, simple inline IPsec scheme does not work well for such platforms. The techniques include using a hardware look-up table for packet classification and inbound security association (SA) lookup in one pass with IP 5-tuple plus SPI as a lookup key at hardware table. The techniques provide an entry match action format and mechanism for deriving inbound SA dram addresses that may be used by a hardware (HW)/firmware (FW) crypto/IPsec engine to process inbound packet traffic. A software SA look-up table is also provided to overcome hardware look-up table resource limitations and support more IPsec session scaling than the physical hardware look-up table can handle. As will be discussed herein, table entries may be dynamically swapped between the hardware look-up table and the software table to ensure busier or critical IPsec sessions are placed on the hardware look-up table for better system performance.

The techniques described herein also provide out of place decryption in the inline IPsec process. Hardware allocates a results buffer for decrypted IPsec payloads so that original encrypted packets remain intact. Both an original buffer (storing the original packets) and the results buffer return to a CPU core when IPsec processing is complete. Efficient packet distribution after inline IPsec decryption is also provided by using the IPsec inner IP header or the IP header in the IPsec payload clear text. The techniques also provide a mechanism for carrying per SA classification data to the HW/FW crypto/IPsec engine and passing the SA classification data back to a CPU core. A mechanism for carrying per packet operation flag/data to and from HW/FW crypto/IPsec engine is also provided. The techniques also support two ways for making a request for inbound IPsec packet processing: directly from the receive module, e.g., network interface controller (NIC) receiver (RX) hardware (HW) (NIC RX HW) and from the CPU core. After IPsec processing, the packet returns to the CPU core with an indication of where the request issued, the NIC RX HW or the CPU core.

The techniques also provide IPsec delayed operations a mechanism for carrying operation data (offsets and delayed operation specification) to the HW/FW crypto/IPsec engine for completing delayed operations. A mechanism is also provided for instructing the HW/FW crypto/IPsec engine to recycle processed packets back to the CPU core instead of directly sending to a transmit module. A symmetric key crypto operation with flexible extra tasks is also described.

Accordingly, as an example of IPsec processing of IPsec packets for routing platforms where IPsec is just one or more features in the middle of data path features on the packet processing path, a receiving module of a system on a chip (SoC) receives a packet. A key identifying an inbound security association (SA) for the packet is determined. A hardware look-up table is searched for the inbound SA of the packet based at least in part on the key. The inbound SA of the packet is determined based at least in part on the searching the hardware look-up table. A corresponding SA memory address for the inbound SA is determined. The corresponding SA memory address for the inbound SA is provided to an internet protocol (IP) security (IPsec) engine for processing of the packet with respect to an IPsec protocol.

As a further example of IPsec processing of IPsec packets for routing platforms where IPsec is just one or more features in the middle of data path features on the packet processing path, the IPsec engine decrypts IPsec features of the packet. The IPsec engine stores the decrypted IPsec features in a buffer. The IPsec engine forwards the packet and the buffer to a central processing unit (CPU) core. The CPU core further processes additional features of the packet. During the further processing, the decrypted IPsec features are retrieved by the CPU core from the buffer.

As a further example of IPsec processing of IPsec packets for routing platforms where IPsec is just one or more features in the middle of data path features on the packet processing path, the IPsec engine collects information related to the packet and the SA, wherein the information comprises one or more packet offsets, IPsec protocol, IPsec next protocol, or feature specific flags. The information is stored in an inbound buffer as metadata. The packet and the metadata are forwarded to a central processing unit (CPU) core. The CPU core processes the packet. The packet and the metadata are forwarded to the IPsec engine. The metadata is stored in an outbound buffer. The IPsec engine encrypts the packet, where the encrypted packet includes the metadata from the outbound buffer.

Additionally, the techniques described herein may be performed by a system and/or apparatus having non-transitory computer-readable media storing computer-executable instructions that, when executed by one or more processors, performs the method described above.

Example Embodiments

Typical inline IPsec hardware implementations on a system on a chip (SoC) use the internet protocol (IP) security (IPsec) security parameter index (SPI) in IPsec packets as an index to a security association (SA) table to locate inbound SAs. However, this simple lookup mechanism does not work for some platforms since some applications, e.g., software defined wide area network (SDWAN), cannot differentiate IPsec tunnels with only SPI. Even some applications, e.g., internet key exchange (IKE) such IKEv1 and IKEv2, that can use SPI to uniquely identify IPsec tunnels may have difficulty since SPI is random and the SPI space is too large, e.g., approximately 4 gigs, to be feasible for direct indexing.

Accordingly, in configurations a hardware look-up table is used to implement a SA look-up table. The lookup table uses the IP 5-tuple of an incoming IPsec packet, plus the SPI of the incoming IPsec packet, as a lookup key at the hardware look-up table, which, in configurations may be part of a network interface controller (NIC) receiver (RX) hardware (HW) of a SoC. As is known, the IP 5-tuple is a collection of five features (protocol plus source and destination IP addresses and ports) that identify a transmission control protocol (TCP)/IP connection. To efficiently use the hardware look-up table, the hardware look-up table may comprise multiple tables with different key sizes. For example, one configuration may use the IP 5-tuple as a key for a first level of the hardware look-up table and the SPI as a key for a second level of the hardware look-up table.

Thus, configurations described herein allow for use of the hardware look-up table for initial packet classification and inbound packet SA look-up in one pass with IP 5-tuple and SPI as lookup keys at the hardware look-up table. Additionally, using the hardware look-up table for SA look-up using the IP 5-tuple as part of a look-up key provides a benefit for supporting inline protocols other than IPsec. For example, the hardware look-up table may be used to support SA look-up for transport layer security/datagram transport layer security (TLS/DTLS) protocols.

In configurations, when using the hardware look-up table for an inbound packet's SA look-up, each entry in the hardware look-up table that is hit provides a result. The result may contain some information specific to the hit entry such as the SA, IPsec protocol, e.g., encapsulating security payloads (ESP) or authentication header (AH), special application (e.g. SDWAN or standard IPSec), etc. The hardware of the SoC may use the information to derive a final SA dynamic random-access memory (DRAM) address that may be passed to a hardware and/or firmware (HW/FW) crypto/IPsec engine.

In configurations, when using the hardware look-up table as an inbound SA look-up table, a critical issue is the available resources for the hardware look-up table and how to support IPsec session scaling. For a given hardware SoC, the hardware look-up table resources are limited and are shared by inline IPsec and other features. Thus, in order to support IPsec session scaling requirements for a given platform, the hardware look-up table may be treated as a hardware cache of an inbound SA look-up table. Accordingly, in configurations, a software lookup table in DRAM is provided so that the IPsec session scaling is only limited by available DRAM in the SoC.

In configurations, when an inbound SA is programmed into the look-up table(s), the SA is always programmed into the software look-up table. The SA is also programmed into the hardware look-up table if the hardware look-up table has the resources. If the hardware look-up table has the resources available, the SA is programmed into the hardware look-up table and IPsec packets for the programmed SA may be processed inline (i.e. no software is involved in processing of the IPsec packets). If there are no resources in the hardware look-up table to program the SA into the hardware look-up table, IPsec packets for the particular SA may not be processed inline, but rather may be sent to a central processing unit (CPU) as a normal packet. The CPU may do an inbound packet SA lookup via the software look-up table and recycle the packet with the located SA to the HW/FW crypto/IPsec engine for IPsec processing.

In configurations, when the hardware look-up table is not large enough to hold all SAs for IPsec sessions, a mechanism may be provided to dynamically swap look-up table entries. When a rekey of the hardware look-up table occurs, older entries may be removed from the hardware look-up first if such older entries are located in the hardware look-up table and then program new SA entries into the hardware look-up table. The older entries removed from the hardware look-up table may remain in the software look-up table. In addition to the rekey time handling, the IPsec sessions may be monitored for usage for designating busier IPsec sessions in the software table by using traffic statistic moving windows (but not in the hardware look-up table). Thus, in configurations, busier IPsec sessions may be swapped into the hardware look-up table, e.g., SAs for busier IPsec sessions may be swapped into the hardware look-up table. Other factors may also be used for the rekey such as, for example, bandwidth or capacity of SAs (IPsec tunnels), least recently used SAs, priority, importance of SAs, etc. Thus, configurations described herein allow for dynamic SA table entry swaps among the hardware look-up table and the software look-up table to ensure busier or critical IPsec sessions are placed in the hardware look-up table for better performance.

In configurations, for out of place decryption in the hardware inline IPsec process, the HW/FW IPsec crypto/engine may allocate a results buffer for decrypted IPsec payloads so that original encrypted packets remain intact. Both the original buffer for IPsec packets and the results buffer return to the CPU core of the SoC when IPsec processing is complete. As is known, the traditional inline IPsec process in the HW/FW crypto/IPsec engine decrypts the IPsec packet in place and passes the decrypted packet to the CPU core for further processing. However, this does not always work for certain platforms. This is because for such platforms, inbound IPsec processing as a feature may not be the first feature in the inbound IPsec packet's feature array. For such inbound IPsec packets, the features ahead of the IPsec features should only be processed in the IPsec packet after the IPsec packet has been processed (decrypted) by IPsec. Thus, in the inline IPsec, in configurations, the NIC RX HW allocates a results buffer along with the original buffer for the inbound IPsec packets before the NIC RX HW passes the packet to the HW/FW crypto/IPsec engine. The HW/FW crypto/IPsec engine may then perform out of place decryption into the results buffer. After inline IPsec processing is done in the HW/FW crypto/IPsec engine, the original IPsec packet, along with the results buffer containing the decrypted text, may be passed to the CPU core of the SoC for further processing. In the CPU core (packet processing element), software may use the original IPsec packet for features that are ahead of the IPsec features in the inbound IPsec packet feature array. When the CPU core reaches the IPsec features in the inbound IPsec packet's feature array for processing, the results of the decrypted IPsec features in the results buffer may be used or "switched in."

After an inbound IPsec packet is decrypted inline, the HW/FW crypto/IPsec engine distributes the packet to the CPU core for further processing. For some platforms, load-based distribution (LBD), flow-based distribution (FBD) and non-strict flow-based distribution (NSFBD) need to be supported. For FBD and NSFBD, the initial packet classification result from the hardware look-up table is used (based on the outer IP address of IPsec packet), all packets for the same SA may be distributed to the same CPU core, even when an IPsec tunnel carries multiple IP flows. This does not result in optimum performance. Thus, in configurations, the hardware look-up table may be used to do a second classification for packet distribution. A few hardware look-up table entries may be used that have "class" information. For example, if the IPsec next protocol is IP in IP encapsulation (IPINIP), then the inner IP addresses may be extracted as a hash key for the IP tunneling. If the IPsec next protocol is multiprotocol label switching (MPLS), then pass the MPLS label and extract the inner IP addresses after the MPLS label for the IP tunneling. It should be noted that information such as the IPsec next protocol is generally carried back from the HW/FW crypto/IPsec engine after the IPsec packet is decrypted and the NIC RX HW automatically extracts the IPsec next protocol from the data that comes from the HW/FW crypto/IPsec engine.

In configurations, a mechanism for carrying per SA classification data to the HW/FW crypto/IPsec engine and passing it back to the CPU core is provided. Also, in configurations, a mechanism for carrying per packet operation flag/data to and from the HW/FW crypto/IPsec engine is provided. In particular, during inline IPsec processing, both the NIC RX HW and the HW/FW crypto/IPsec engine collects some information regarding the IPsec packet and its SA. The information, including packet offsets, IPsec protocol, IPsec next protocol, feature specific flags, the SA itself, etc. may be passed to the CPU core via metadata at distribution time and the metadata may be translated into a packet sub-block for IPsec features in the CPU core for the CPU core to use.

In configurations, support may be provided in two ways for making a request for inbound IPsec packet processing: directly from the NIC RX HW and from the CPU core. After IPsec processing, the packet may come back to the CPU core with an indication on where the request was issued: the NIC RX HW or the CPU core. As previously discussed herein, there might be inbound SAs that are not programmed in the hardware look-up table due to resource limits of the hardware look-up table. Thus, valid IPsec packets may not be able to be processed inline by the HW/FW crypto/IPsec engine directly. This may also happen even when a SA is programmed into the hardware look-up table, for example when a packet is an IP fragment. Thus, IPsec processing needs to be supported both at the inline HW/FW crypto/IPsec engine and at the CPU core.

Accordingly, in configurations, IPsec processing (packet parsing and decryption) is always done by the HW/FW crypto/IPsec engine, but inbound SA lookup may be done by the CPU core. To that end, a path from the CPU core directly to the HW/FW crypto/IPsec engine is provided via recycle (loopback). When an IPsec packet comes to the CPU core without decryption, e.g., the SA for the IPsec packet was not found in the hardware look-up table, the IPsec inbound SA lookup is initiated using the software lookup table based on the failure to find the SA in the hardware look-up table. After the SA is located in the software lookup table, the packet may be recycled along with the SA and any relevant information as metadata to HW/FW crypto/IPsec engine. Then the HW/FW crypto/IPsec engine may process this IPsec packet as if it arrived from the NIC RX HW, except there is no need for out of place decryption. When the HW/FW crypto/IPsec engine is finished, the decrypted packet may be sent to the NIC RX HW for a second classification from the hardware look-up table based on the decrypted inner IP address, which may then distribute the decrypted packet to the CPU core. The CPU core may treat such packets as a recycled packet and resume feature execution.

As is known, in traditional inline IPsec outbound packet processing, the inner IP packet is passed to the HW/FW crypto/IPsec engine to encapsulate and encrypt the packet and then transmit the IPsec packet out of the SoC via a transmit module, e.g., a NIC transmitter (TX) HW. However, in some platforms there are other features in the IPsec packet's feature array after the IPsec features (i.e., features expect an encapsulated IPSec packet, not the inner IP packet), so traditional inline IPsec outbound processing does not work for such platforms. Thus, in configurations, the IPsec outbound processing operations are split into small tasks and the tasks are grouped for in-core processing tasks (performed by the CPU core) and delayed operations. In-core tasks include preparing IPsec outbound packets by calculating various offsets and header encapsulation. Delayed operations include sequence number generation, IPsec padding, trailer, encryption, statistics, and UDP/TCP check sum, etc. The delayed operations are performed by the HW/FW crypto/IPsec engine. The HW/FW crypto/IPsec engine directly outputs the output packet to the transmit module or traffic management of the SoC after completion of the delayed IPsec operations HW/FW crypto/IPsec engine.

In configurations, a mechanism is provided for carrying operation data (offsets and delayed operation specification) to the HW/FW crypto/IPsec engine for completing delayed operations. In order for the HW/FW crypto/IPsec engine to perform delayed operations, related information of the delayed operations needs to be passed to the HW/FW crypto/IPsec engine. Thus, metadata may be embedded in an engine command descriptor to pass the related information to the HW/FW crypto/IPsec engine.

In configurations, a mechanism is provided for instructing the HW/FW crypto/IPsec engine to recycle a processed packet back to the CPU core, instead of directly sending the processed packet to the transmit module. Typically, with a request coming from the CPU core via recycle to the HW/FW crypto/IPsec engine, the HW/FW crypto/IPsec engine directly outputs the result packet to the transmit module. However, it is desirable to have a mechanism to instruct the HW/FW crypto/IPsec engine to send the packet back to the CPU core. This mechanism may be in the form of operation flags carried in metadata passed to the HW/FW crypto/IPsec engine.

In configurations, a symmetric key context creation/deletion/modification is provided for the HW/FW crypto/IPsec engine. The symmetric key context represents a session containing info pertaining to a set of crypto symmetric key operations for all packets subject to the crypto symmetric key operations. In configurations, per session (key context) data is separated from per packet (operation) data to make crypto operation threads safe and lockless. Per packet operation data may contain specific operation commands and related data.

In configurations, a mechanism is provided to attach application specific features to the symmetric key context so that besides crypto symmetric key operations, the HW/FW crypto/IPsec engine may perform extra application specific features, such as generate sequence number, generate check sum, conduct anti-replay checking, etc. This mechanism provides flexibility for distributing protocol implementation tasks to different HW/FW entities of the SoC.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
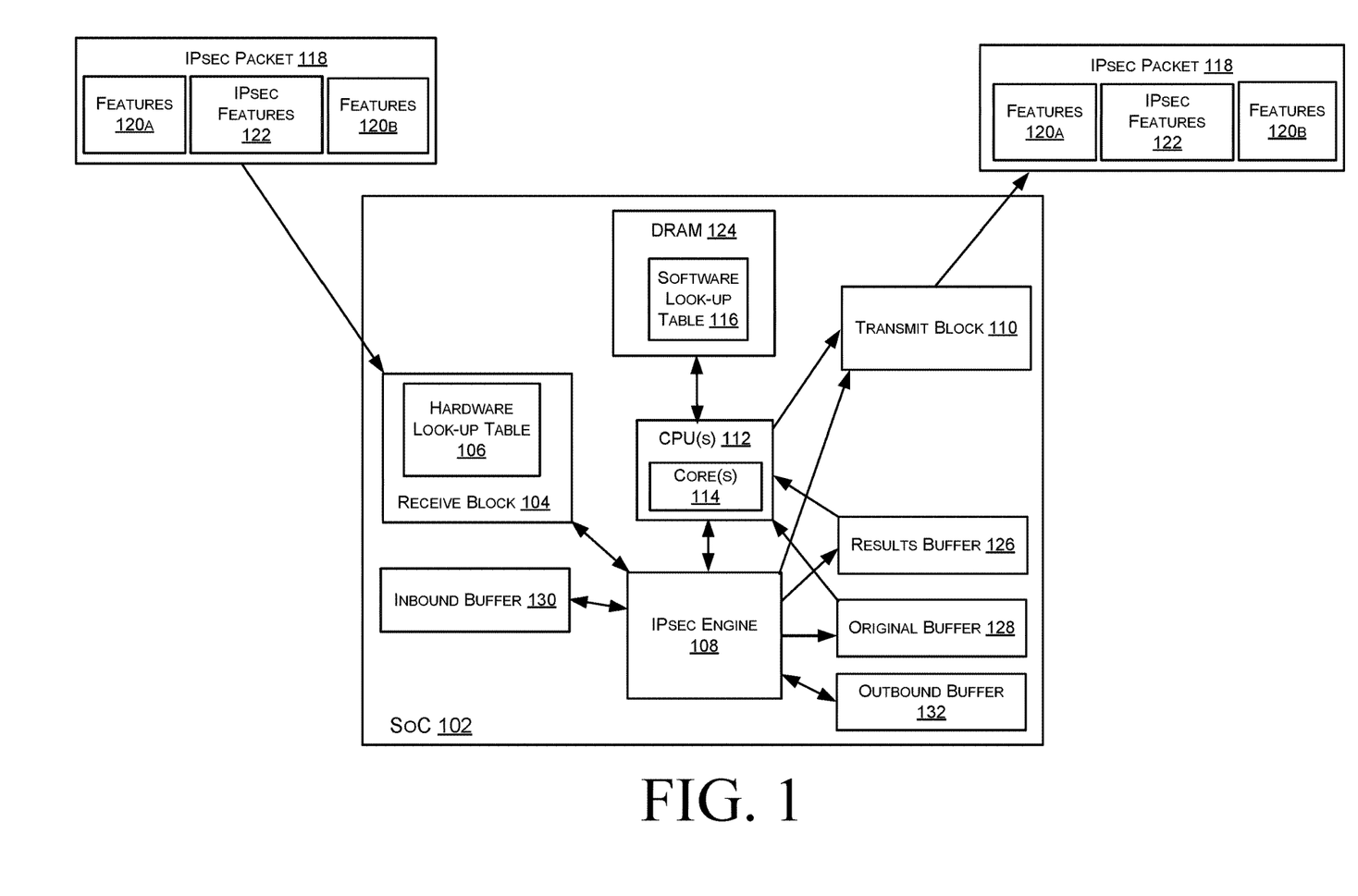
FIG. 1 schematically illustrates an example of a system on a chip (SoC) configured for IPsec processing of IPsec packets for routing platforms where IPsec is just one or more features in the middle of data path features on the packet processing path.

FIG. 1 schematically illustrates an example of a system on a chip (SoC) 102. One or more of the SoCs 102 may be included within an electronic device, e.g., a router. The SoC 102 includes a receive module 104 that, in configurations, comprises a network interface controller (NIC) receiver (RX) hardware (HW). In configurations, the receive module 104 includes a hardware look-up table 106 for storing security associations (SAs) and packet classifications for inbound packets. The SoC 102 also includes a hardware (HW) and/or firmware (FW) cryptographic (crypto)/IPsec engine 108 (referred to herein as HW/FW crypto/IPsec engine or simply IPsec engine) that may be implemented via hardware and/or firmware. In configurations, the SoC 102 may include multiple HW/FW crypto/IPsec engines 108. The SoC 102 also includes a transmit module 110 that, in configurations, comprises a NIC transmitter (TX) HW. The SoC 102 also includes one or more central processing units (CPUs) 112, with each CPU 112 comprising one or more cores 114. The SoC 102 also includes a software table 116 for storing security associations (SAs)/IPsec tunnels for IP sessions and packet classifications for inbound packets. IPsec packets 118 are routed inbound to the SoC 102 for processing as described herein and then routed outbound from the SoC 102 as described herein. Each packet comprises one or more features 120a and 120b, along with IPsec features 122.

As previously noted, typical inline IPsec hardware implementations on SoCs use the IPsec security parameter index (SPI) in IPsec packets as an index to a SA table to locate inbound SAs. However, this simple lookup mechanism does not work for some platforms since some applications, e.g., software defined wide area network (SDWAN), cannot differentiate IPsec tunnels with only SPI. Even some applications, e.g., internet key exchange (IKE) such IKEv1 and IKEv2, that can use SPI to uniquely identify IPsec tunnels may have difficulty since SPI is random and the SPI space is too large, e.g., approximately 4 gigs, to be feasible for direct indexing.

Accordingly, in configurations the hardware look-up table 106 is used to implement a SA look-up table. The hardware lookup table 106 uses the IP 5-tuple of an incoming IPsec packet, plus the SPI of the incoming IPsec packet 118, as a lookup key at the hardware look-up table 106, which, as previously noted, in configurations may be part of the receive module 104 (e.g., NIC RX HW) of the SoC 102. As is known, the IP 5-tuple is a collection of five features (protocol plus source and destination IP addresses and ports) that identify a transmission control protocol (TCP)/IP connection. To efficiently use the hardware look-up table 106, the hardware look-up table 106 may comprise multiple tables with different key sizes, e.g., the hardware look-up table 106 may be a hierarchal look-up table. For example, one configuration may use the IP 5-tuple as a key for a first level of the hardware look-up table 106 and the SPI as a key for a second level of the hardware look-up table 106.

Thus, configurations described herein allow for use of the hardware look-up table 106 for initial packet classification and inbound packet 118 SA look-up in one pass with IP 5-tuple and SPI as lookup keys at the hardware look-up table. Additionally, using the hardware look-up table 106 for SA look-up using the IP 5-tuple as part of a look-up key provides a benefit for supporting inline protocols other than IPsec. For example, the hardware look-up table 106 may be used to support SA look-up for transport layer security/datagram transport layer security (TLS/DTLS) protocols.

In configurations, when using the hardware look-up table 106 for an inbound packet's SA look-up, each entry in the hardware look-up table 106 that is hit provides a result. The result may contain some information specific to the hit entry such as the SA, IPsec protocol, e.g., encapsulating security payloads (ESP) or authentication header (AH), special application (e.g. SDWAN or standard IPSec), etc. The hardware of the SoC 102 may use the information to derive a final SA dynamic random-access memory (DRAM) address that may be passed to the hardware and/or firmware (HW/FW) crypto/IPsec engine 108.

In configurations, when using the hardware look-up table 106 as an inbound SA look-up table, a critical issue is the available resources, e.g., available capacity, for the hardware look-up table 106 and how to support IPsec session scaling. For a given hardware SoC, the hardware look-up table 106 resources are limited and are shared by inline IPsec and other features. Thus, in order to support IPsec session scaling requirements for a given platform, the hardware look-up table 106 may be treated as a hardware cache of an inbound SA look-up table. Accordingly, in configurations, the software lookup table 116 is provided in DRAM 124 so that the IPsec session scaling is only limited by available DRAM 124 in the SoC 102.

In configurations, when an inbound SA is programmed into the look-up table(s), e.g., the hardware look-up table 106 and the software look-up table 116, the SA is always programmed into the software look-up table 116. The SA is also programmed into the hardware look-up table 106 if the hardware look-up table 106 has the resources available. If the hardware look-up table 106 has the resources, the SA is programmed into the hardware look-up table 106 and IPsec packets 118 for the programmed SA may be processed inline (i.e. no software is involved in processing of the IPsec packets). If there are no resources in the hardware look-up table 106 to program the SA into the hardware look-up table 106, e.g., the hardware look-up table 106 does not have any available capacity, IPsec packets 118 for the particular SA may not be processed inline, but rather may be sent to one of the CPUs 112 as a normal packet. The CPU 112, via one of its cores 114, may do an inbound packet SA lookup via the software look-up table 116 and recycle the packet 118 with the located SA to the HW/FW crypto/IPsec engine 108 for IPsec processing.

In configurations, when the hardware look-up table 106 is not large enough to hold all SAs for IPsec sessions, a mechanism may be provided to dynamically swap look-up table entries between the hardware look-up table 106 and the software look-up table 116. When a rekey of the hardware look-up table 106 occurs, older entries may be removed from the hardware look-up table 106 first if such older entries are located in the hardware look-up table 106 and then program newer, more recent SA entries into the hardware look-up table 106. The older entries removed from the hardware look-up table may remain in the software look-up table 116. In addition to the rekey time handling, the IPsec sessions may be monitored for usage for designating busier IPsec sessions in the software table 116 by using traffic statistic moving windows (but not in the hardware look-up table 106). Thus, in configurations, busier IPsec sessions may be swapped into the hardware look-up table 106, e.g., SAs for busier IPsec sessions may be swapped into the hardware look-up table 106. Other factors may also be used for the rekey such as, for example, bandwidth or capacity of SAs (IPsec tunnels), least recently used SAs, priority, importance of SAs, etc. Thus, configurations described herein allow for dynamic SA table entry swaps among the hardware look-up table 106 and the software look-up table 116 to ensure busier or critical IPsec sessions are placed in the hardware look-up table for better performance.

In configurations, for out of place decryption in the hardware inline IPsec process, the HW/FW IPsec crypto/engine 108 may allocate a results buffer 126 for decrypted IPsec payloads so that original encrypted packets remain intact. Both an original buffer 128 for the IPsec packet 118 and the results buffer 126 return to a CPU core 114 of the SoC 102 when IPsec processing of the IPsec packet 118 is complete. As is known, the traditional inline IPsec process in the HW/FW crypto/IPsec engine 108 decrypts the IPsec packet 118 in place and passes the decrypted packet to a CPU core 114 for further processing. However, this does not always work for certain platforms. This is because for such platforms, inbound IPsec processing as a feature may not be the first feature in the inbound IPsec packet's feature array, e.g., features 120a appear in the feature array before the IPsec features 122. For such inbound IPsec packets 118, the features 120a ahead of the IPsec features 122 should only be processed in the IPsec packet 118 after the IPsec packet 118 has been processed (decrypted) by IPsec. Thus, in the inline IPsec, in configurations, the receive module 104, e.g., NIC RX HW, allocates the results buffer 126 along with the original buffer 128 for the inbound IPsec packets 118 before the receive module 104 passes the packet to the HW/FW crypto/IPsec engine 108. The HW/FW crypto/IPsec engine 108 may then perform out of place decryption into the results buffer 126. After inline IPsec processing is done in HW/FW crypto/IPsec engine 108, the original IPsec packet, along with the results buffer 126 containing the decrypted text, may be passed to a CPU core 114 of the SoC 114 for further processing of features, e.g., features 120a, 120b. In the CPU core 114, software may use the original IPsec packet for features, e.g., features 120a, that are ahead of the IPsec features 122 in the inbound IPsec packet feature array. When the CPU core 114 reaches the IPsec features 122 in the inbound IPsec packet's feature array for processing, the IPsec decrypted results in the results buffer 126 may be used or "switched in."

After an inbound IPsec packet 118 is decrypted inline, the HW/FW crypto/IPsec engine 108 distributes the IPsec packet 118 to a CPU core 114 for further processing. For some platforms, load-based distribution (LBD), flow-based distribution (FBD) and non-strict flow-based distribution (NSFBD) need to be supported. For FBD and NSFBD, the initial packet classification result from the hardware look-up table 106 (or software look-up table 116) is used (based on the outer IP address of IPsec packet), all IPsec packets 118 for the same SA may be distributed to the same CPU core 114, even when an IPsec tunnel carries multiple IP flows. This does not result in optimum performance. Thus, in configurations, the hardware look-up table 106 may be used to do a second classification for packet distribution. A few hardware look-up table entries may be used that have "class" information. For example, if the IPsec next protocol is IP in IP encapsulation (IPINIP), then the inner IP addresses may be extracted as a hash key for the IP tunneling. If the IPsec next protocol is multiprotocol label switching (MPLS), then pass the MPLS label and extract the inner IP addresses after the MPLS label for the IP tunneling. It should be noted that information such as the IPsec next protocol is generally carried back from the HW/FW crypto/IPsec engine 108 after the IPsec packet 118 is decrypted and the receive module, e.g., NIC RX HW, automatically extracts the IPsec next protocol from the data that comes from the HW/FW crypto/IPsec engine 108.

In configurations, a mechanism for carrying per SA classification data to the HW/FW crypto/IPsec engine 108 and passing it back to a CPU core 114 is provided. Also, in configurations, a mechanism for carrying per packet operation flag/data to and from the HW/FW crypto/IPsec engine is provided. In particular, during inline IPsec processing, both the receive module 104, e.g., NIC RX HW, and the HW/FW crypto/IPsec engine 108 collects some information regarding the IPsec packet 118 and its SA. The information, including packet offsets, IPsec protocol, IPsec next protocol, feature specific flags, the SA itself, etc. may be stored as metadata in an inbound buffer 130. The metadata be passed to the CPU core 114 at distribution time and the metadata may be translated into a packet sub-block for IPsec features in the CPU core 114 for the CPU core 114 to use.

In configurations, support may be provided in two ways for making a request for inbound IPsec packet processing: directly from the receive module 104, e.g., NIC RX HW, and from a CPU core 114. After IPsec processing, the IPsec packet 118 may come back to the CPU core 114 with an indication on where the request was issued: the receive module 104, e.g., NIC RX HW or the CPU core 114. As previously discussed herein, there might be inbound SAs that are not programmed in the hardware look-up table 106 due to resource limits of the hardware look-up table 106. Thus, valid IPsec packets 118 may not be able to be processed inline by the HW/FW crypto/IPsec engine 118 directly. This may also happen even when a SA is programmed into the hardware look-up table 106, for example when a packet is an IP fragment. Thus, IPsec processing needs to be supported both at the inline HW/FW crypto/IPsec engine 108 and at the CPU cores 114.

Accordingly, in configurations, IPsec processing (packet parsing and decryption) is always done by the HW/FW crypto/IPsec engine 108, but inbound SA lookup may be done by a CPU core 114. To that end, a path from the CPU cores 114 directly to the HW/FW crypto/IPsec engine 108 may be provided via recycle (loopback). When an IPsec packet 118 comes to a CPU core 114 without decryption, e.g., the SA for the IPsec packet 118 was not found in the Hardware look-up table 106, the IPsec inbound SA lookup is initiated by the CPU core 114 using the software lookup table 116 based on the failure to find the SA in the hardware look-up table 106. After the SA is located from the software lookup table 116, the IPsec packet 118 may be recycled along with the SA and any relevant information as metadata to the HW/FW crypto/IPsec engine 108. The HW/FW crypto/IPsec engine 108 may process this IPsec packet 118 as if it arrived from the receive module 104, e.g., NIC RX HW, except there is no need for out of place decryption. When the HW/FW crypto/IPsec engine 108 is finished, the decrypted packet may be sent to the receive module 104, e.g., NIC RX HW, for a second classification from the hardware look-up table 106 based on the decrypted inner IP address, which may then distribute the decrypted IPsec packet 118 to the CPU core 114. The CPU core 114 may treat such IPsec packets 118 as a recycled packet and resume feature execution on the IPsec packet 118.

As is known, in traditional inline IPsec outbound packet processing, the inner IP packet is passed to the HW/FW crypto/IPsec engine 108 with metadata to encapsulate and encrypt the packet and then transmit the IPsec packet out of the SoC 102. The metadata may be stored in an outbound buffer 132. The HW/FW crypto/IPsec engine 108 may encrypt the IPsec 118, including the metadata from the outbound buffer 132, and pass the resulting IPsec packet to the transmit module 110, e.g., NIC TX HW, for transmission out of the SoC 102.

In some platforms there are other features, e.g., features 120b, in the IPsec packet's feature array after the IPsec features 122 (i.e., features expect an encapsulated IPSec packet, not the inner IP packet), so traditional inline IPsec outbound processing does not work for such platforms. Thus, in configurations, the IPsec outbound processing operations may be split into small tasks and the tasks are grouped for in-core processing tasks (performed by the CPU core 114) and delayed operations. In-core tasks include preparing IPsec outbound packets 118 by calculating various offsets and header encapsulation. Delayed operations include sequence number generation, IPsec padding, trailer, encryption, statistics, and UDP/TCP check sum, etc. The delayed operations are performed by the HW/FW crypto/IPsec engine 108. The HW/FW crypto/IPsec engine 108 directly outputs the outbound IPsec packet 118 to the transmit module 110, e.g., NIC TX HW, or traffic management of the SoC 102 after completion of the delayed IPsec operations by the HW/FW crypto/IPsec engine 108.

In configurations, a mechanism is provided for carrying operation data (offsets and delayed operation specification) to the HW/FW crypto/IPsec engine 108 for completing delayed operations. In order for the HW/FW crypto/IPsec engine 108 to perform delayed operations, related information of the delayed operations needs to be passed to the HW/FW crypto/IPsec engine 108. Thus, metadata may be embedded in an engine command descriptor to pass the related information to the HW/FW crypto/IPsec engine 108.

In configurations, a mechanism is provided for instructing the HW/FW crypto/IPsec engine 108 to recycle a processed IPsec packet 118 back to the CPU core 114, instead of directly sending the processed packet to the transmit module 110, e.g., NIC TX HW. Typically, with a request coming from the CPU core 114 via recycle to the HW/FW crypto/IPsec engine 108, the HW/FW crypto/IPsec engine 108 directly outputs the resulting IPsec packet to the transmit module 110, e.g., NIC TX HW. However, it is desirable to have a mechanism to instruct the HW/FW crypto/IPsec engine 108 to send the packet back to the CPU core 114. This mechanism may be in the form of operation flags carried in metadata passed to the HW/FW crypto/IPsec engine 108. Once finished with outbound processing operations, the CPU core 114 may send packet to the transmit module 110 for transmitting the packet out of the SoC 102.

In configurations, a symmetric key context creation/deletion/modification is provided for the HW/FW crypto/IPsec engine 108. The symmetric key context represents a session containing info pertaining to a set of crypto symmetric key operations for all IPsec packets 118 subject to the crypto symmetric key operations. In configurations, per session (key context) data is separated from per packet (operation) data to make crypto operation threads safe and lockless. Per packet operation data may contain specific operation commands and related data.

In configurations, a mechanism is provided to attach application specific features to the symmetric key context so that besides crypto symmetric key operations, the HW/FW crypto/IPsec engine 108 may perform extra application specific features, such as generate sequence number, generate check sum, conduct anti-replay checking, etc. This mechanism provides flexibility for distributing protocol implementation tasks to different HW/FW entities of the SoC 102.

Figure 2:
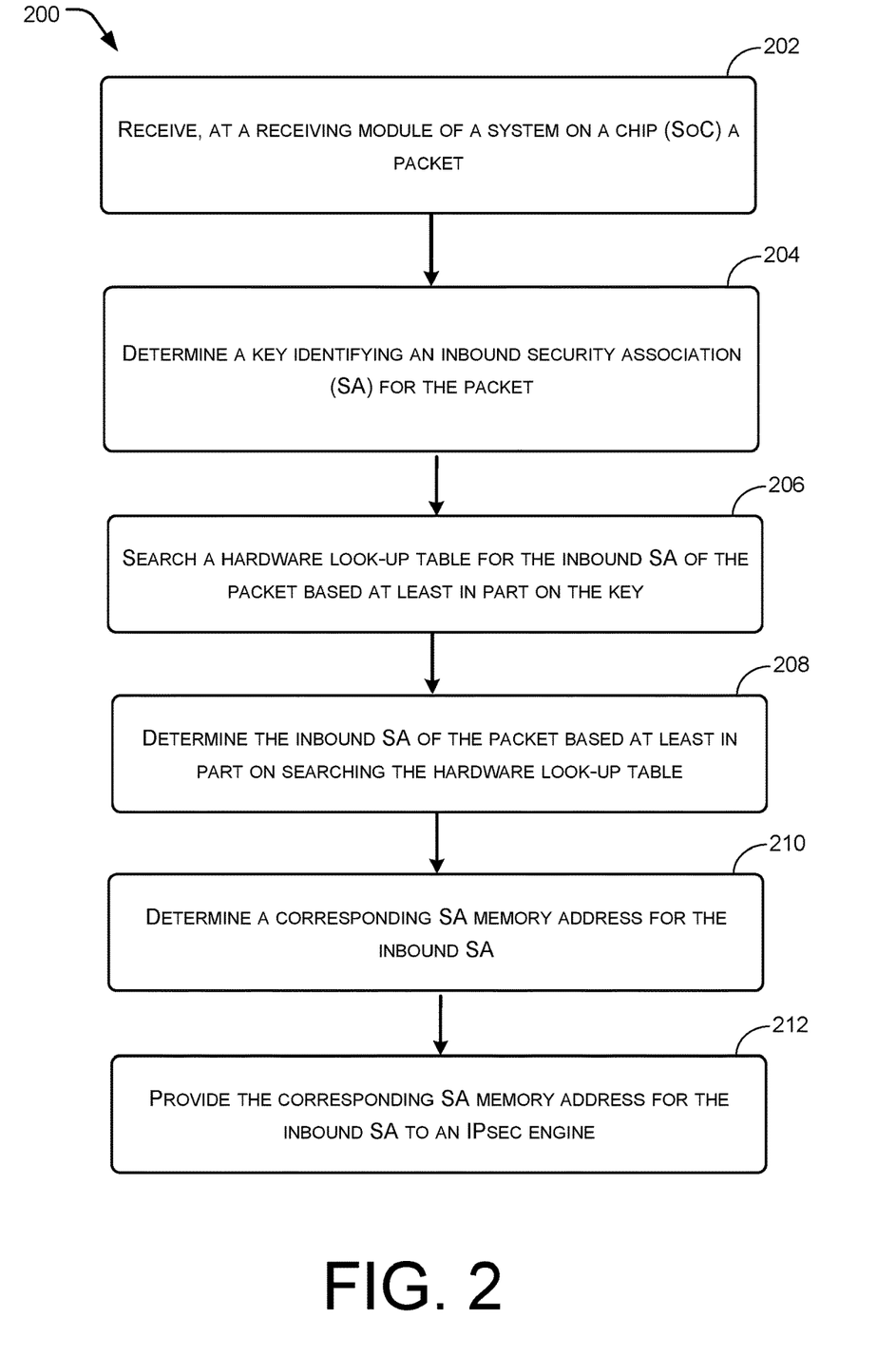
FIGS. 2-4 illustrate flow diagrams of example methods of IPsec processing of IPsec packets for routing platforms where IPsec is just one or more features in the middle of data path features on the packet processing path.
Figure 3:
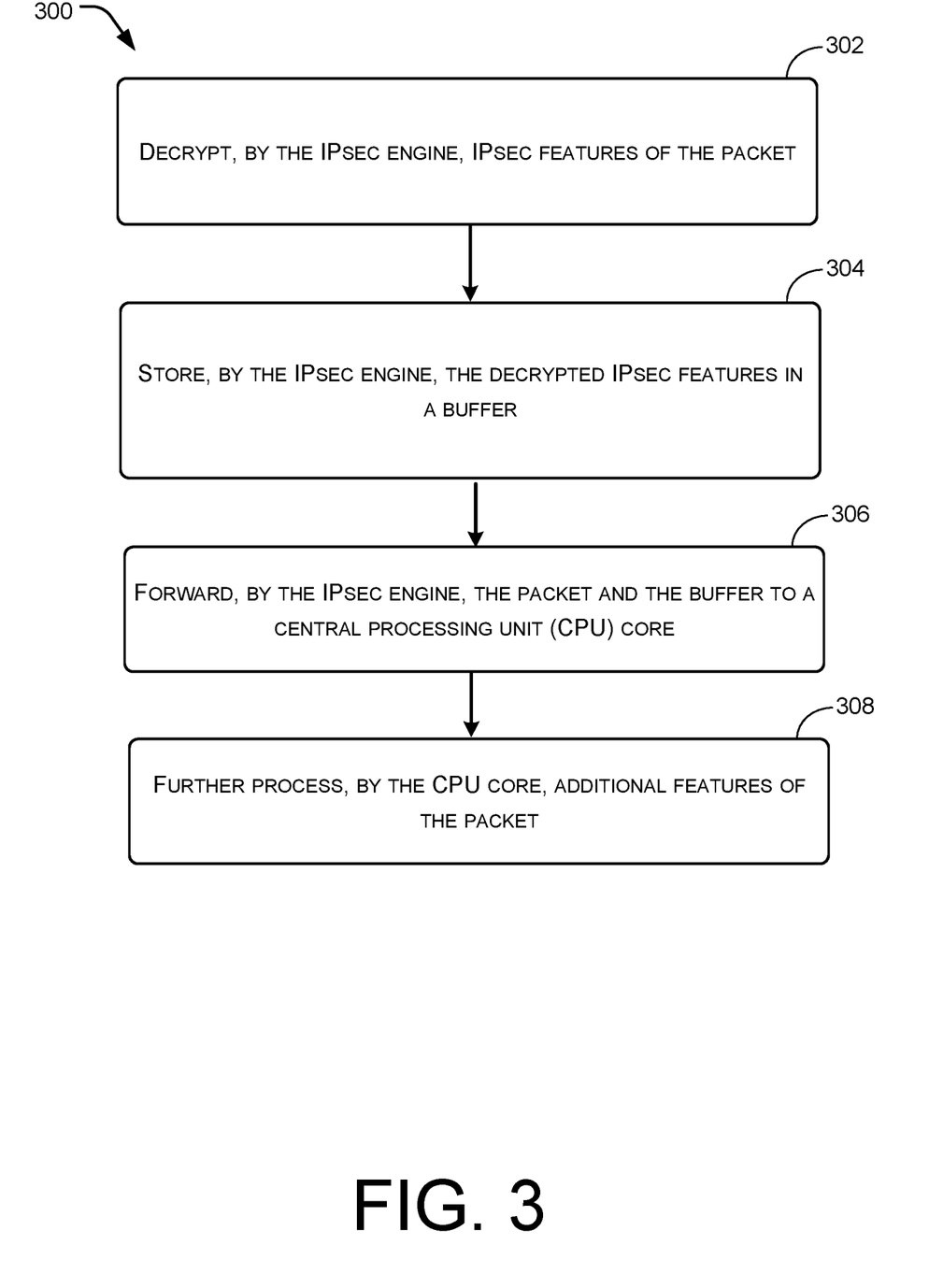
Figure 4:
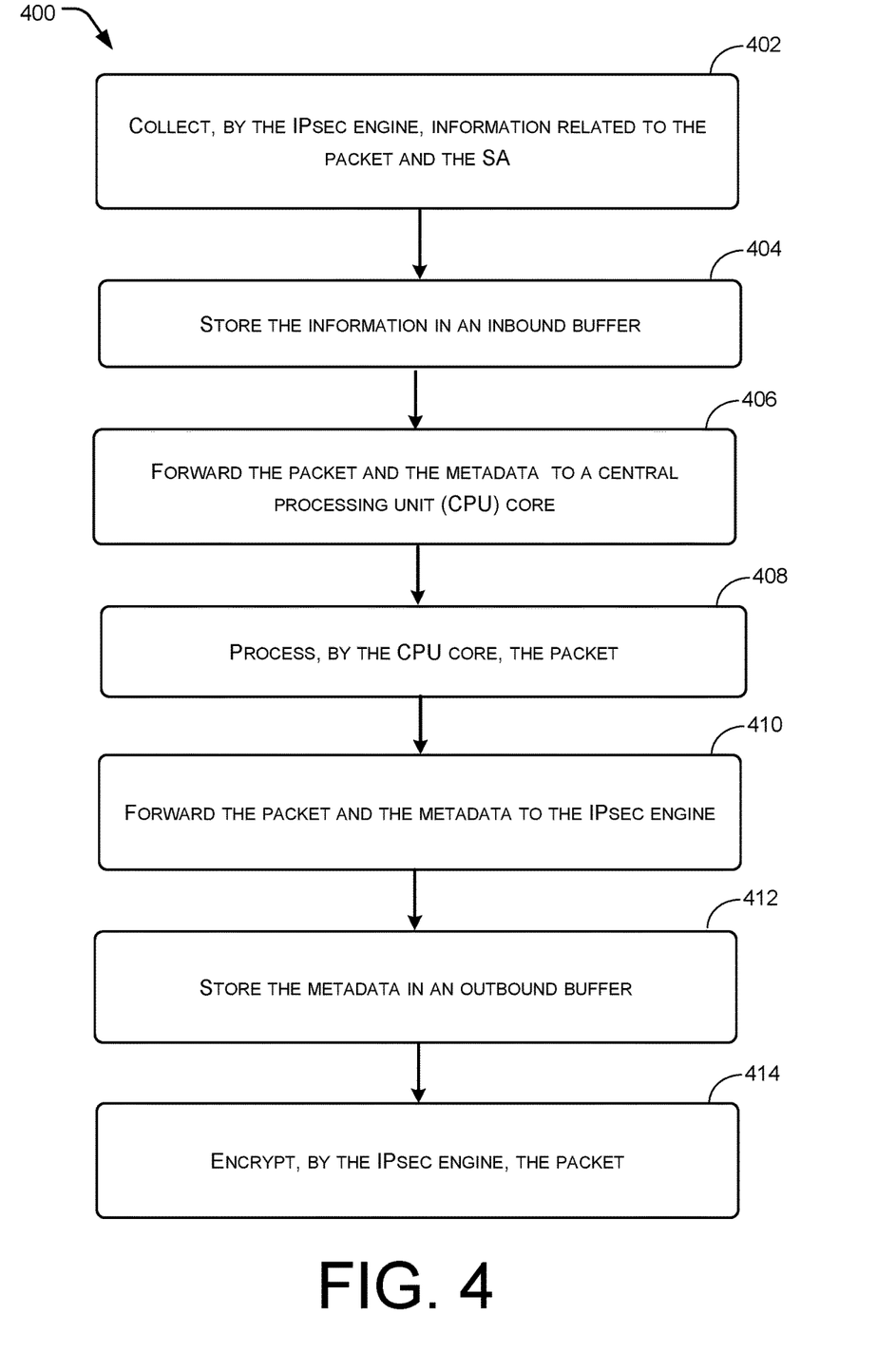

FIGS. 2-4 illustrate flow diagrams of example methods 300 that illustrate aspects of the functions described herein. The logical operations described herein with respect to FIGS. 2-4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIGS. 2-4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 2 illustrates a flow diagram of an example method 200 of IPsec processing of IPsec packets, e.g., IPsec packets 118, for routing platforms where IPsec is just one or more features, e.g., features 122, in the middle of data path features, e.g., features 120a, 120b, on the packet processing path. At 202, a receiving module, e.g., receive module 104, of a system on a chip (SoC), e.g., SoC 102, receives a packet, e.g., IPsec packet 118. At 204, a key identifying an inbound security association (SA) for the packet is determined. As an example, the key may comprise the IP 5-tuple and the SPI. At 206, a hardware look-up table, e.g., hardware look-up table 106, is searched for the inbound SA of the packet based at least in part on the key. At 208, the inbound SA of the packet is determined based at least in part on searching the hardware look-up table. At 210, a corresponding SA memory address for the inbound SA is determined. At 212, the corresponding SA memory address for the inbound SA is provided to an IPsec engine, e.g., HW/FW crypto/IPsec engine 108, for processing of the packet with respect to an IPsec protocol.

FIG. 3 illustrates a flow diagram of an example method 300 of IPsec processing of IPsec packets, e.g., IPsec packets 118, for routing platforms where IPsec is just one or more features, e.g., features 122, in the middle of data path features, e.g., features 120a, 120b, on the packet processing path. At 302, the IPsec engine decrypts IPsec features of the packet. At 304, the IPsec engine stores the decrypted IPsec features in a buffer, e.g., results buffer 126. At 306, the IPsec engine forwards the packet and the buffer to a central processing unit (CPU) core, e.g., one of CPU cores 114. At 308, the CPU core further processes additional features of the packet. During the further processing, the decrypted IPsec features are retrieved by the CPU core from the buffer.

FIG. 4 illustrates a flow diagram of an example method 400 of IPsec processing of IPsec packets, e.g., IPsec packets 118, for routing platforms where IPsec is just one or more features, e.g., features 122, in the middle of data path features, e.g., features 120a, 120b, on the packet processing path. At 402, the IPsec engine collects information related to the packet and the SA. The information comprises one or more packet offsets, IPsec protocol, IPsec next protocol, or feature specific flags. At 404, the information is stored in an inbound buffer, e.g., inbound buffer 130, as metadata. At 406, the packet and the metadata are forwarded to a central processing unit (CPU) core, e.g., one of CPU cores 114. At 408, the CPU core processes the packet. At 410, the packet and the metadata are forwarded to the IPsec engine. At 412, the metadata is stored in an outbound buffer, e.g., outbound buffer 132. At 414, the IPsec engine encrypts the packet. The encrypted packet includes the metadata from the outbound buffer.

The example methods 200, 300, and/or 400 may be performed individually or in combination with one or more of example methods 200, 300, and/or 400.

Figure 5:
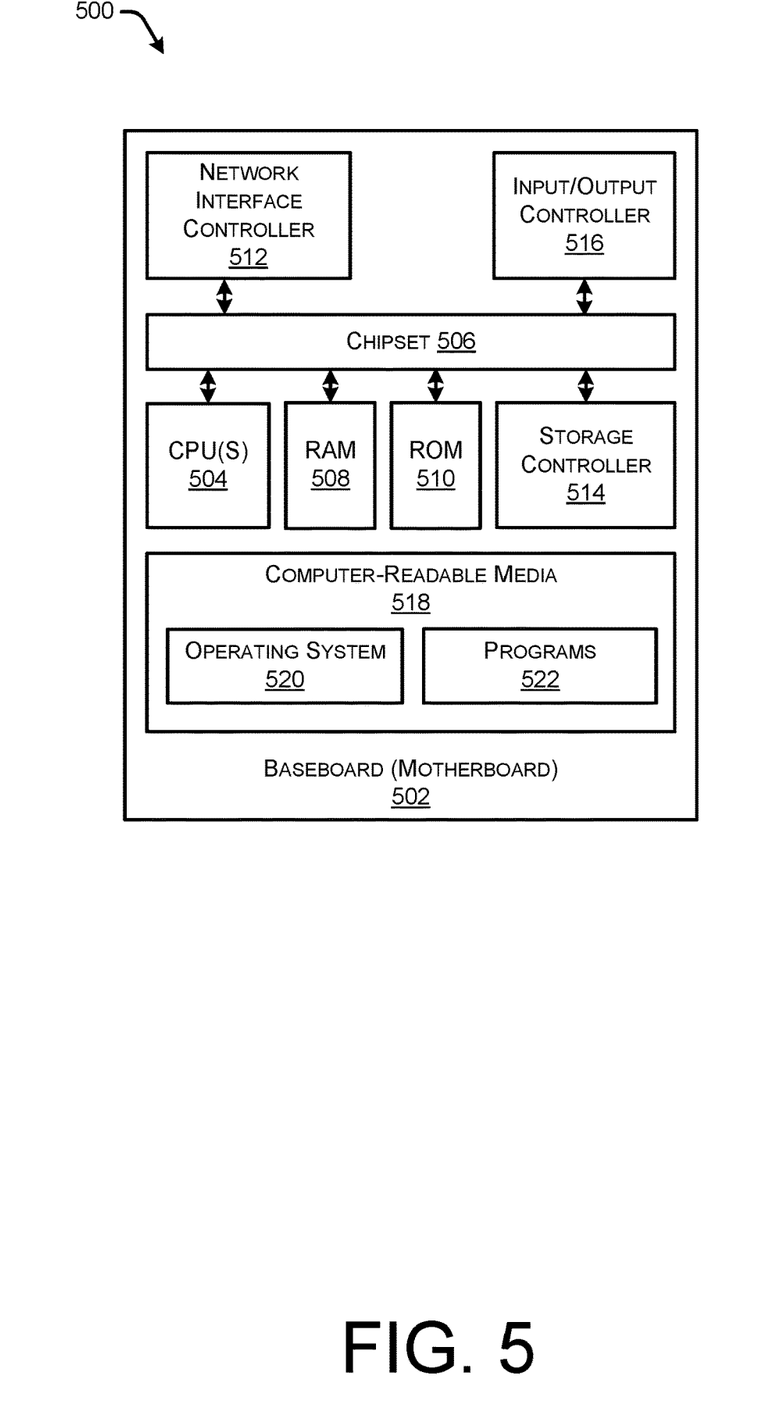
FIG. 5 is an architecture diagram showing an illustrative electronic device hardware architecture for implementing one or more elements that can be utilized to implement aspects of the various technologies presented herein.

FIG. 5 shows an example architecture for an electronic device 500 capable of executing program components for implementing the functionality described above. One or more electronic devices 500 shown in FIG. 5 may comprise networked devices such as servers, switches, routers, hubs, bridges, gateways, modems, repeaters, access points, etc., and can be utilized to execute any of the software components presented herein. One or more of the components described with respect to electronic device 500 may be implemented as a SoC, e.g., SoC 102.

The electronic device 500 includes a baseboard 502, or "motherboard," which is a printed circuit board to which a multitude of components or devices can be connected by way of a system bus or other electrical communication paths. In one illustrative configuration, one or more central processing units ("CPUs") 504 (each comprising one or more CPU cores) operate in conjunction with a chipset 506. The CPUs 504 can be standard programmable processors that perform arithmetic and logical operations necessary for the operation of the electronic device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the electronic device 500. The chipset 506 can further provide an interface to a computer-readable storage medium such as a read-only memory ("ROM") 510 or non-volatile RAM ("NVRAM") for storing basic routines that help to startup the electronic device 500 and to transfer information between the various components and devices. The ROM 510 or NVRAM can also store other software components necessary for the operation of the electronic device 500 in accordance with the configurations described herein.

The electronic device 500 can operate in a networked environment using logical connections to remote computing devices and electronic device systems through a network. The chipset 506 can include functionality for providing network connectivity through a network interface controller (NIC) 512, such as a gigabit Ethernet adapter. The NIC 512 is capable of connecting the electronic device 500 to other computing devices over the network. It should be appreciated that multiple NICs 512 can be present in the electronic device 500, connecting the electronic device to other types of networks and remote computer systems.

The electronic device 500 can be connected to a storage device 518 that provides non-volatile storage for the electronic device. The storage device 518 can store an operating system 520, programs 522, and data, which have been described in greater detail herein. The storage device 518 can be connected to the electronic device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between electronic devices and physical storage units.

The electronic device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the electronic device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The electronic device 500 can further read information from the storage device 518 by detecting the physical states or characteristics of one or more particular locations within the physical storage units.

In addition to the mass storage device 518 described above, the electronic device 500 can have access to other computer-readable storage media to store and retrieve information, such as program modules, data structures, or other data. It should be appreciated by those skilled in the art that electronic device-readable storage media is any available media that provides for the non-transitory storage of data and that can be accessed by the electronic device 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the electronic device 500. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the electronic device 500.

In one embodiment, the storage device 518 or other computer-readable storage media is encoded with computer-executable instructions which, when loaded into the electronic device 500, transform the electronic device from a general-purpose computing system into a special-purpose electronic device capable of implementing the embodiments described herein. These computer-executable instructions transform the electronic device 500 by specifying how the CPUs 504 transition between states, as described above. According to one embodiment, the electronic device 500 has access to computer-readable storage media storing computer-executable instructions which, when executed by the electronic device 500, perform the various processes described above with regard to FIGS. 1-4. The electronic device 500 can also include computer-readable storage media having instructions stored thereupon for performing any of the other computer-implemented operations described herein.

The electronic device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the electronic device 500 might not include all of the components shown in FIG. 5, can include other components that are not explicitly shown in FIG. 5, or might utilize an architecture completely different than that shown in FIG. 5.

The programs 522 may comprise any type of programs or processes to perform the techniques described in this disclosure for managing workloads in compute clusters comprising compute nodes by managing the workloads at the resource level of the compute clusters. Generally, the programs 522 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving, at a receiving module of a system on a chip (SoC), a packet;
determining a key identifying an inbound security association (SA) for the packet;
searching a hardware look-up table for the inbound SA of the packet based at least in part on the key;
determining the inbound SA of the packet based at least in part on the searching the hardware look-up table;
determining a corresponding SA memory address for the inbound SA;
providing the corresponding SA memory address for the inbound SA to an internet protocol (IP) security (IPsec) engine for processing of the packet with respect to an IPsec protocol;
decrypting, by the IPsec engine, IPsec features of the packet;
storing, by the IPsec engine, decrypted IPsec features in a buffer;
forwarding, by the IPsec engine, the packet and the buffer to a central processing unit (CPU) core; and further processing, by the CPU core, additional features of the packet, wherein during the further processing, the decrypted IPsec features are retrieved by the CPU core from the buffer, wherein forwarding, by the IPsec engine, the packet and the buffer to the CPU core is based at least in part on a decrypted inner IP address of the packet and a classification related to the decrypted inner IP address of the packet in the hardware look-up table.

2. The method of claim 1, wherein determining the inbound SA of the packet comprises:
searching a software look-up table for the inbound SA of the packet based at least in part on (i) the key and (ii) failure to locate the inbound SA in the hardware look-up table; and
locating the inbound SA in the software look-up table.

3. The method of claim 2, further comprising:
programming all inbound SAs into the software look-up table; and
programming at least some inbound SAs into the hardware look-up table based at least in part on available capacity in the hardware look-up table.

4. The method of claim 3, further comprises:
dynamically exchanging entries between the software look-up table and the hardware look-up table.

5. The method of claim 1, further comprising:
locating the inbound SA in the hardware look-up table, wherein locating the inbound SA in the hardware look-up table includes locating information comprising one or more of the IPsec protocol or a special application,
wherein determining the corresponding SA memory address for the inbound SA comprises determining the corresponding SA memory address for the inbound SA based at least in part on the information.

6. The method of claim 1, wherein the hardware look-up table comprises a hierarchical hardware look-up table.

7. The method of claim 1, further comprising:
performing, by the CPU core, first outbound IPsec operations on the packet;
forwarding, by the CPU core, the packet to the IPsec engine;
performing, by the IPsec engine, second outbound IPsec operations on the packet, wherein the second outbound IPsec operations are provided to the IPsec engine in metadata of the packet; and
forwarding the packet to traffic management of the SoC.

8. The method of claim 1, further comprising:
collecting, by the IPsec engine, information related to the packet and the SA, wherein the information comprises one or more packet offsets, IPsec protocol, IPsec next protocol, or feature specific flags;
storing the information in an inbound buffer as metadata;
forwarding the packet and the metadata to a central processing unit (CPU) core;
processing, by the CPU core, the packet;
forwarding the packet and the metadata to the IPsec engine;
storing the metadata in an outbound buffer; and
encrypting, by the IPsec engine, the packet, the packet including the metadata from the outbound buffer.

9. A system on a chip (SoC) comprising:
an internet protocol (IP) security (IPsec) engine;
one or more central processing unit (CPU) cores; and
one or more non-transitory computer-readable media storing computer-executable instructions that, when executed by one of the IPsec engine or one of the one or more CPU cores, cause the IPsec engine or the one of one or more CPU cores to perform actions comprising:
receiving a packet;
determining a key identifying an inbound security association (SA) for the packet;
searching a hardware look-up table for the inbound SA of the packet based at least in part on the key;
determining the inbound SA of the packet based at least in part on the searching the hardware look-up table;
determining a corresponding SA memory address for the inbound SA;
providing the corresponding SA memory address for the inbound SA to the IPsec engine for processing of the packet with respect to an IPsec protocol;
decrypting, by the IPsec engine, IPsec features of the packet;
storing, by the IPsec engine, decrypted IPsec features in a buffer;
forwarding, by the IPsec engine, the packet and the buffer to the one of the one or more CPU cores; and
further processing, by the one of the one or more CPU cores, additional features of the packet, wherein during the further processing the decrypted IPsec features are retrieved by the one of the one or more CPU cores from the buffer,
wherein forwarding, by the IPsec engine, the packet and the buffer to the one of the one or more CPU cores is based at least in part on a decrypted inner IP address of the packet and a classification related to the decrypted inner IP address of the packet in the hardware look-up table.

10. The system on a chip of claim 9, wherein determining the inbound SA of the packet comprises:
searching a software look-up table for the inbound SA of the packet based at least in part on (i) the key and (ii) failure to locate the inbound SA in the hardware look-up table; and
locating the inbound SA in the software look-up table.

11. The system on a chip of claim 10, wherein the actions further comprise:
programming all inbound SAs into the software look-up table; and
programming at least some inbound SAs into the hardware look-up table based at least in part on available capacity in the hardware look-up table.

12. The system on a chip of claim 9, wherein the actions further comprise:
locating the inbound SA in the hardware look-up table, wherein locating the inbound SA in the hardware look-up table includes locating information comprising one or more of the IPsec protocol or a special application,
wherein determining the corresponding SA memory address for the inbound SA comprises determining the corresponding SA memory address for the inbound SA based at least in part on the information.

13. The system on a chip of claim 9, wherein the actions further comprise:
performing, by the one of the one or more CPU cores, first outbound IPsec operations on the packet;
forwarding, by the one of the one or more CPU cores, the packet to the IPsec engine;
performing, by the IPsec engine, second outbound IPsec operations on the packet, wherein the second outbound IPsec operations are provided to the IPsec engine in metadata of the packet; and
forwarding the packet to traffic management of the SoC.

14. The system on a chip of claim 9, wherein the actions further comprise:
- collecting, by the IPsec engine, information related to the packet and the SA, wherein the information comprises one or more packet offsets, IPsec protocol, IPsec next protocol, or feature specific flags;
- storing the information in an inbound buffer as metadata;
- forwarding the packet and the metadata to one of the one or more CPU cores;
- processing, by the one of the one or more CPU cores, the packet;
- forwarding the packet and the metadata to the IPsec engine;
- storing the metadata in an outbound buffer; and
- encrypting, by the IPsec engine, the packet, the packet including the metadata from the outbound buffer.

15. An electronic device comprising a system on a chip (SoC), the SoC comprising:
- an internet protocol (IP) security (IPsec) engine;
- one or more central processing unit (CPU) cores; and
- one or more non-transitory computer-readable media storing computer-executable instructions that, when executed by one of the IPsec engine or a CPU core of the one or more CPU cores, cause the IPsec engine or the one of one or more CPU cores to perform actions comprising:
- receiving a packet;
- determining a key identifying an inbound security association (SA) for the packet;
- searching a hardware look-up table for the inbound SA of the packet based at least in part on the key;
- determining the inbound SA of the packet based at least in part on the searching the hardware look-up table;
- determining a corresponding SA memory address for the inbound SA;
- providing the corresponding SA memory address for the inbound SA to the IPsec engine for processing of the packet with respect to an IPsec protocol;
- decrypting, by the IPsec engine, IPsec features of the packet;
- storing, by the IPsec engine, decrypted IPsec features in a buffer;
- forwarding, by the IPsec engine, the packet and the buffer to the one of the one or more CPU cores; and
- further processing, by the one of the one or more CPU cores, additional features of the packet, wherein during the further processing the decrypted IPsec features are retrieved by the one of the one or more CPU cores from the buffer,
- wherein forwarding, by the IPsec engine, the packet and the buffer to the one of the one or more CPU cores is based at least in part on a decrypted inner IP address of the packet and a classification related to the decrypted inner IP address of the packet in the hardware look-up table.

16. The electronic device of claim 15, wherein the actions further comprise:
- collecting, by the IPsec engine, information related to the packet and the SA, wherein the information comprises one or more packet offsets, IPsec protocol, IPsec next protocol, or feature specific flags;
- storing the information in an inbound buffer as metadata;
- forwarding the packet and the metadata to one of the one or more CPU cores;
- processing, by the one of the one or more CPU cores, the packet;
- forwarding the packet and the metadata to the IPsec engine;
- storing the metadata in an outbound buffer; and
- encrypting, by the IPsec engine, the packet, the packet including the metadata from the outbound buffer.

17. The electronic device of claim 15, wherein the actions further comprise:
- performing, by the one of the one or more CPU cores, first outbound IPsec operations on the packet;
- forwarding, by the one of the one or more CPU cores, the packet to the IPsec engine;
- performing, by the IPsec engine, second outbound IPsec operations on the packet, wherein the second outbound IPsec operations are provided to the IPsec engine in metadata of the packet; and
- forwarding the packet to traffic management of the SoC.

18. The electronic device of claim 15, wherein determining the inbound SA of the packet comprises:
- searching a software look-up table for the inbound SA of the packet based at least in part on (i) the key and (ii) failure to locate the inbound SA in the hardware look-up table; and
- locating the inbound SA in the software look-up table.

19. The electronic device of claim 18, wherein the actions further comprise:
- programming all inbound SAs into the software look-up table; and
- programming at least some inbound SAs into the hardware look-up table based at least in part on available capacity in the hardware look-up table.

20. The electronic device of claim 15, wherein the actions further comprise:
- locating the inbound SA in the hardware look-up table, wherein locating the inbound SA in the hardware look-up table includes locating information comprising one or more of the IPsec protocol or a special application,
- wherein determining the corresponding SA memory address for the inbound SA comprises determining the corresponding SA memory address for the inbound SA based at least in part on the information.

* * * * *